(12) United States Patent
Flondro et al.

(10) Patent No.: US 7,203,494 B2
(45) Date of Patent: Apr. 10, 2007

(54) OPTIMIZING RADIO COMMUNICATION EFFICIENCY AND METHODS THEREOF

(75) Inventors: Dan S. Flondro, Algonquin, IL (US); Timothy J. Wilson, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 141 days.

(21) Appl. No.: 10/988,230

(22) Filed: Nov. 12, 2004

(65) Prior Publication Data

US 2006/0105769 A1 May 18, 2006

(51) Int. Cl.
*H04Q 7/20* (2006.01)

(52) U.S. Cl. ............... 455/437; 455/436; 455/438; 455/439; 455/452.1; 455/452.2

(58) Field of Classification Search ........ 455/436–442, 455/452.1, 453, 456.4, 451, 452.2, 418, 561, 455/550.1; 370/331, 332, 333, 334
See application file for complete search history.

(56) References Cited

U.S. PATENT DOCUMENTS

| | | | |
|---|---|---|---|
| 6,201,966 B1 * | 3/2001 | Rinne et al. ............ 455/434 |
| 6,633,766 B1 | 10/2003 | van der Pol | |
| 6,711,230 B1 | 3/2004 | Nicholls et al. | |
| 2002/0077138 A1 * | 6/2002 | Bark et al. ................ 455/522 |
| 2002/0123316 A1 * | 9/2002 | Sih et al. ................. 455/245.1 |
| 2002/0137514 A1 * | 9/2002 | Mitsugi et al. ........... 455/436 |
| 2003/0153287 A1 * | 8/2003 | Kuiri ........................ 455/127 |
| 2004/0174833 A1 * | 9/2004 | Raith ........................ 370/311 |
| 2004/0176044 A1 | 9/2004 | Wells et al. | |
| 2004/0180686 A1 | 9/2004 | Nakayama | |
| 2004/0252789 A1 * | 12/2004 | Sundaralingam ........... 375/336 |
| 2005/0186923 A1 * | 8/2005 | Chen et al. ............... 455/127.1 |
| 2006/0055595 A1 * | 3/2006 | Bustamante et al. ... 342/357.02 |
| 2006/0084391 A1 * | 4/2006 | Chmiel ..................... 455/69 |

* cited by examiner

*Primary Examiner*—Duc M. Nguyen
*Assistant Examiner*—Dai Phuong

(57) ABSTRACT

A selective call radio (106) operating in a communication system (100) including a plurality of radio base stations (104) operating in a corresponding plurality of communication zones (102), wherein the selective call radio is programmed to measure (206) a temperature of the selective call radio receiving radiated signals from a first one of the plurality of communication zones, measure (204) in the selective call radio an in-service signal power based on the radiated signals, determine (208) a modified signal power and an in-service signal power correction factor corresponding to the temperature, and perform a handover (212) from the first communication zone to a second one of the plurality of communication zones if the modified signal power and a handover threshold satisfy a predetermined condition.

17 Claims, 2 Drawing Sheets

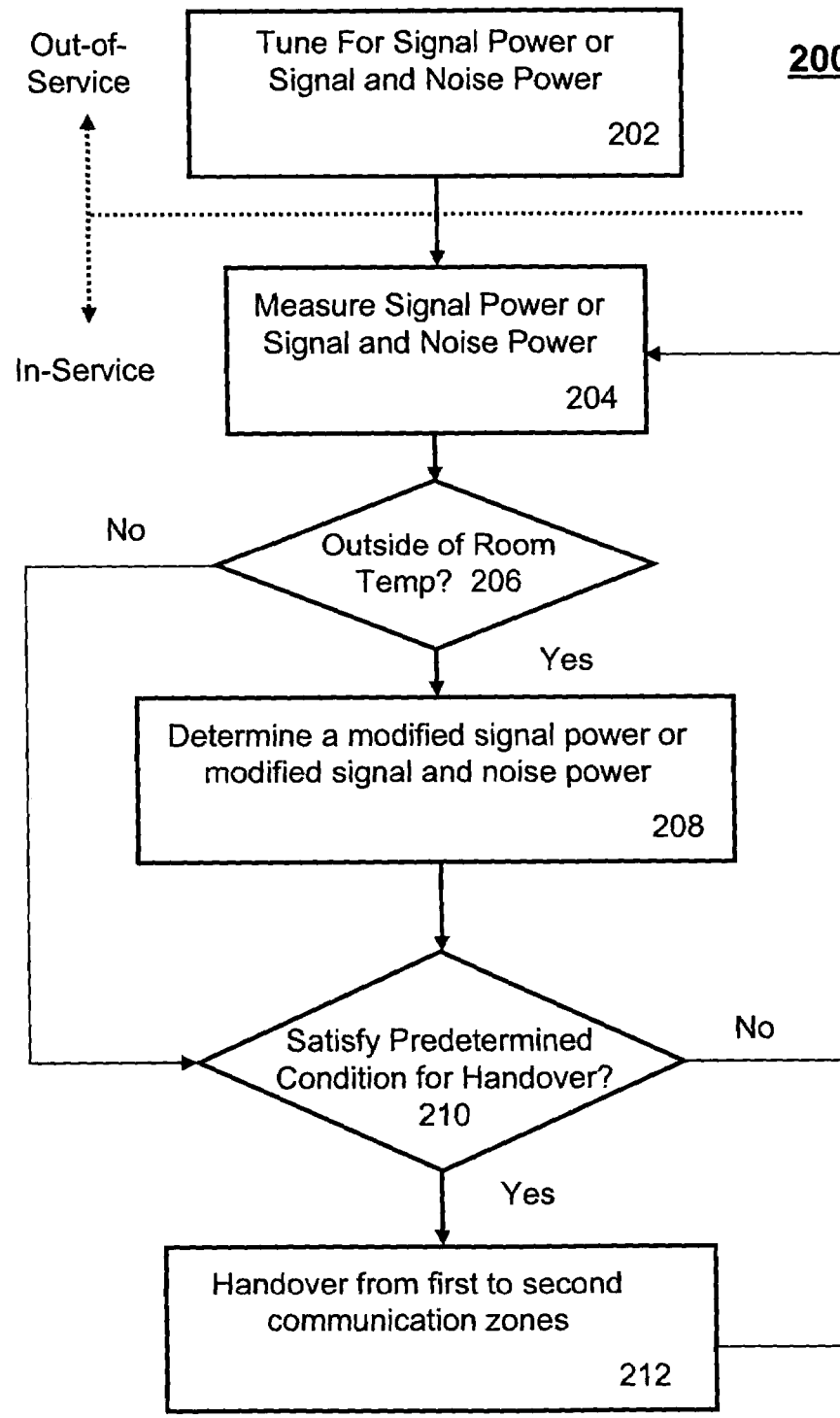

OPTIMIZING RADIO COMMUNICATION EFFICIENCY AND METHODS THEREOF

FIELD OF THE INVENTION

This invention relates generally to radio communication systems, and more particularly to optimizing radio communication efficiency and methods thereof.

BACKGROUND OF THE INVENTION

In cellular communications it is common practice to utilize a number of cellular base stations, each covering adjacent cell sites, which in the aggregate provide radio communications within a geographic area spanning, for example, a metropolitan area. As a mobile phone crosses between cell sites a radio handover process takes place between the mobile phone and the base station operating in the crossover cell site.

This process is generally determined by conventional handover algorithms in the mobile phone and in some instances the base stations. Due to environmental conditions such as temperature, mobile phones are prone to transfer radio communications too soon or too late which can result in dropped calls. Cellular network designers have compensated for this problem by adding more cellular base stations to minimize this occurrence. This compensation scheme is, however, costly to cellular carriers, and inevitably results in higher consumer rates. Similar problems are observed in wireless local area networks (WLAN).

SUMMARY OF THE INVENTION

Embodiments in accordance with the invention provide a system and method for optimizing radio communication efficiency.

In a first embodiment of the present invention, in a selective call radio operating in a communication system having a plurality of communication zones, a method of minimizing handovers between the selective call radio and the plurality of communication zones can include the steps of measuring a temperature of the selective call radio receiving radiated signals from a first one of the plurality of communication zones, measuring in the selective call radio an in-service signal power based on the radiated signals, determining a modified signal power from the in-service signal power and an in-service signal power correction factor corresponding to the temperature, and performing a handover by the selective call radio from the first communication zone to a second one of the plurality of communication zones if the modified signal power and a handover threshold satisfy a predetermined condition.

In a second embodiment of the present invention, a selective call radio operating in a communication system having a plurality of radio base stations operating in a corresponding plurality of communication zones, can include a processor programmed to measure a temperature of the selective call radio receiving radiated signals from a first one of the plurality of communication zones, measure an in-service signal power based on the radiated signals, determine a modified signal power from the in-service signal power and an in-service signal power correction factor corresponding to the temperature, and perform a handover from the first communication zone to a second one of the plurality of communication zones if the modified signal power and a handover threshold satisfy a predetermined condition.

In a third embodiment of the present invention, a radio base station among a plurality of radio base stations in communications with a selective call radio can include a processor programmed to measure a temperature of the radio base station receiving radiated signals from the selective call radio in a communication zone of the radio base station, measure an in-service signal power based on the radiated signals, determine a modified signal power from the in-service signal power and an in-service signal power correction factor corresponding to the temperature, and instruct the selective call radio to handover communication from the communication zone of the radio base station to a second communication zone of a corresponding second base station if the modified signal power and a handover threshold satisfy a predetermined condition.

BRIEF DESCRIPTION OF THE DRAWINGS

FIG. 2 is a flow chart illustrating a method for optimizing radio communication efficiency in accordance with an embodiment of the present invention.

DETAILED DESCRIPTION OF THE DRAWINGS

Figure 1:
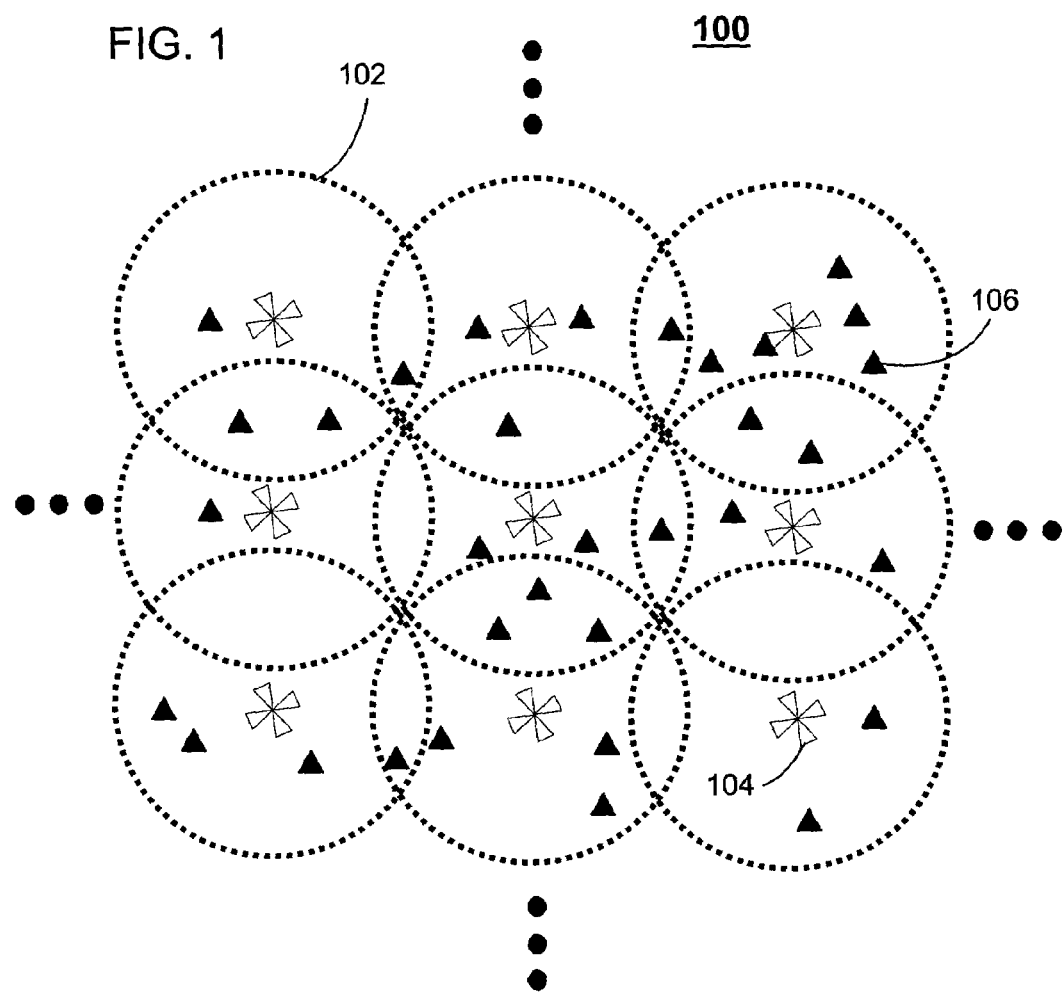
FIG. 1 is an illustration of a communication system in accordance with an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is an illustration of a communication system 100 comprising one or more mobile selective call radios 106 each communicating with one of a plurality of fixed radio base stations 104 operating in a corresponding plurality of communication zones 102. Each communication zone 102 covers a predefined geographic range for wireless communications between a radio base station 104 and one or more selective call radios 106 operating within the communication zone 102 of the radio base station 104.

Figure 3:
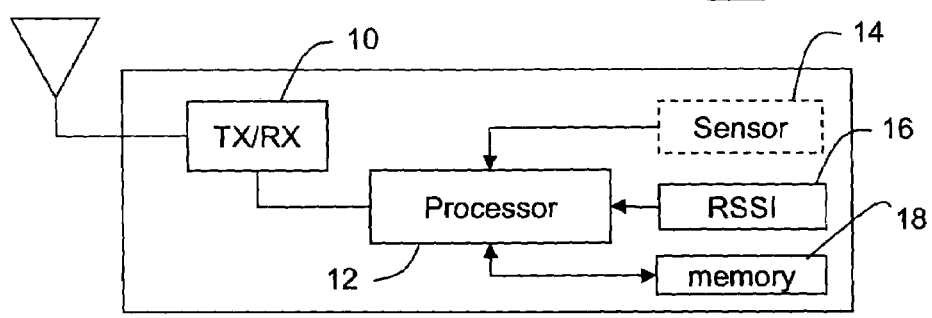
FIG. 3 is a block diagram of a selective call transceiver in accordance with an embodiment of the present invention.

Each selective call radio 106 and radio base station 104 employs a conventional digital or analog wireless transceiver (e.g., an AM or FM quadrature, super heterodyne, or other conventional modulation and demodulation technique) and base band technology such as an analog to digital converter coupled to a digital signal processor (DSP) or other similar digital or analog technology to process voice and data messages transmitted to and from the radio base stations 104. Each selective call radio 106 may also include conventional input and output technology for visual (e.g., display), textual (e.g., keypad) and audible (microphone and speaker) for voice and entertainment interaction with a user of the selective call radio 106. As shown in further detail in FIG. 3, a particular selective call radio 106 (or optionally a radio base station 104) can include a transceiver 10 and a processor 12 coupled to the transceiver 10. The processor 12 can be programmed to measure a temperature of the selective call radio receiving radiated signals using a sensor 14 such as a thermistor, bipolar junction transistor, or similar device. The processor 12 can further be programmed to measure an in-service signal power based on the radiated signals using a received signal strength indicator (RSSI) 16 or other methods as further detailed below. The processor 12 can also determine a modified signal power from the in-service signal power and an in-service signal power correction factor corresponding to the temperature that can be stored in a memory 18 coupled to the processor 12.

The communication system may be representative of long-range, mid-range or short-range communication networks. For example, in one embodiment, the communication network represents a cellular network for long-range communications that employs conventional communication protocols (e.g., CDMA: Code Division Multiple Access, GSM: Global System for Mobile communications, etc.) for communications. Alternatively, the communication network represents a WLAN for short-range communications employing conventional protocols such as 802.11. For illustration purposes only, the description below will focus on a communication system 100 comprising a cellular network. It will be appreciated by one of ordinary skill in the art that the embodiments of the invention are applicable to any radio system that employs handover algorithms for multi-zone communications.

The selective call radio 106 can use conventional temperature and signal and noise power sensing technology. The temperature sensor (e.g., a thermistor, bipolar junction transistor, or similar technology) can be used to measure ambient temperature of the selective call radio 106. Signal power can be measured by way of squaring the amplitude of a signal received by the receiving portion of the wireless transceiver and comparing the received signal power to the signal power of a controlled radiated or conductive signal fed into the selective call radio 106. For example, in a quadrature demodulation scheme, the in-phase (I) and quadrature (Q) components of a received signal may be squared and summed to determine signal power. It should be noted that any other signal power sensing approach can be used to measure signal power herein.

Noise power comprises two components: thermal and interference. Thermal noise power may be measured by back-calculating an expected signal to noise ratio (SNR) of the receiving portion of the wireless transceiver which in turn provides an expected bit (or packet) error rate of received signals, which is compared to the actual bit (or packet) error rate measured by the selective call radio 106 of received messages generated by a controlled radiated or conductive signal fed into the selective call radio 106. The measured difference between actual and expected bit or packet error rates may then be used to calculate actual noise power from a conventional curve fit equation or look-up table representing the expected SNR of the receiving portion of the wireless transceiver. Interference noise power comes from adjacent communication zones 102 transmitting at the same frequency under a frequency reuse scheme. This interference may be measured by the selective call radio 106 by way of using a conventional I-Q constellation method and comparing an expected I, Q vector to a received I, Q vector to determine the level of adjacent communication zone 102 interference.

How the signal and noise power measurements are used by an embodiment of the invention will be described shortly in the flow chart 200 of FIG. 2. It should be noted that the radio base stations 104 can use a wireless transceiver, base band processing and sensing technology similar to the technology described above for the selective call radio 106. The main difference between the selective call radios 106 and the base stations 104 is that the latter are typically geographically fixed communication elements, each covering a communication zone 102 of the communication system 100. Accordingly, flow chart 200 of FIG. 2 will focus primarily on the functional implementation of an embodiment of the invention in the selective call radios 106 and the radio base stations 104 rather than the structural circuit design of either device.

Referring to FIG. 2, a flow chart illustrating a method 200 for optimizing radio communication efficiency of the communication system 100 is shown. The operation described in method 200 is applicable to the selective call radio 106 and the radio base stations 104 alike as mentioned above.

We begin method 200 with a description of the selective call radio 106 operation. In step 202, the selective call radio 106 is tuned for signal power, or in an alternative embodiment of the invention, signal and noise power. For illustration only, the tuning step will be described for both signal and noise power. It will be appreciated, however, that the invention described below is operable with only signal power tuning.

Returning to step 202, the selective call radio 106 is tuned in a controlled environment. The controlled environment may be a factory with controlled temperature and radiated or conductive signal power fed into the selective call radio 106 to tune the signal and noise power components of each of a plurality of selective call radios 106. For purposes of illustration only, the controlled environment will be referred to herein as a factory operating at room temperature (e.g., 25 degrees Celsius) feeding a conductive signal (i.e., a physical electrical coupling like, for example, a coax cable) at a known power level (e.g., −90 dBm) into the receiving portion of the wireless transceiver of the selective call radio 106. Alternative environments suitable for tuning can be used and are intended to be within the scope of the claimed invention.

During the tuning process, the selective call radio 106 (or factory equipment coupled thereto) can measure from the conductive signal, out-of-service signal and noise powers using the conventional signal and noise power sensing techniques described above. The term "out-of-service" is representative of the fact that the selective call radio 106 is being tuned while outside its normal operation within the communication system 100. Once the out-of-service signal power is measured it is compared to the signal power of the conductive signal. Any difference between the two signals results in an out-of-service signal power correction factor, which is used to remove this offset. For instance, if the out-of-service signal power measured is −87 dBm, then the out-of-service signal power correction factor will be −3 dBm to maintain a constant −90 dBm signal power reading.

In an embodiment where noise power is used, an out-of-service noise power signal is measured from thermal and/or interference noise power components. Thermal noise power can be determined at room temperature using a conventional technique for back-calculating noise power from the comparison of an expected SNR and corresponding bit or packet error rate to the actual bit or packet error rate measured from a known conductive signal power source. Comparing an expected interference power level from a controlled conductive signal with a known interference source injected therein, and comparing the actual signal vector measured by the selective call radio 106 to an expected signal vector using the conventional constellation technique mentioned above determines interference noise power.

Each of the thermal and interference noise power calculations above are used to create corresponding thermal and interference offsets from expected thermal and interference noise power levels calculated from conventional theoretical analysis of the receiving circuit portion of the wireless transceiver. An out-of-service noise power baseline is determined singly or in combination from the thermal and interference offsets. This baseline can be used as a reference point for calculating in-service noise power correction factors (as described below) based on thermal variance and interference variance when the selective call radio 106 is operating within one of the communication zones 102.

Although the tuning step 202 described above is useful to the embodiment described herein, it is not limiting to the claimed invention below, and may be replaced by alternative embodiments. For instance, the plurality of selective call radios 106 may be assumed to use the same out-of-service signal power correction factor and out-of-service noise power baseline, which can be derived, respectively, from theoretical and/or experimental analysis. In such an embodiment, the tuning step 202 can be eliminated altogether.

Proceeding with a description of steps 204–212, these steps represent in-service operation of the selective call radio 106, while step 202 represents out-of-service operation (e.g., factory tuning) of the selective call radio 106. The term "in-service" refers to operation of the selective call radio 106 in any one of the plurality of communication zones 102 of the communication system 100. In step 204, the selective call radio 106 measures using the sensing techniques described above, in-service signal power, or in an alternative embodiment, in-service signal and noise powers. For illustration only, the description below will apply both in-service signal and noise power measurements throughout steps 204–208. It will be appreciated that the embodiments herein remain operable with only signal power processing to determine whether a handover is warranted.

In step 206, the selective call radio 106 measures ambient temperature while operating in the one communication zone 102. If ambient temperature is below or above room temperature (that is, outside of room temperature), the selective call radio 106 proceeds to step 208, otherwise, it proceeds to step 210. Note step 206 may be a precise measurement or ranges. For example, room temperature may be considered a range (e.g., 25+/−3 degrees Celsius) as opposed to an exact measure. Any temperature readings falling outside of this range would be considered outside of room temperature. In step 208, the selective call radio 106 (or a processor therein) determines modified signal and noise powers from the radiated signals received from the radio base station 104. The process for determining the modified signal and noise powers is described below.

From the temperature measured in step 206, a corresponding in-service signal power correction factor is either calculated from a curve-fit or accessed from a look-up table in conventional memory of the selective call radio 106. The in-service signal power correction factor is determined from a characterization of at least one of the plurality of selective call radios. Characterization of these devices can be performed across at least three variables in a controlled environment such as a laboratory, power supply, radiated or conductive signal power, and ambient temperature each supplied in a controlled manner to the selective call radio 106.

A three variable array or curve-fitting formula may be developed to derive a look-up table or equation for calculating a number of in-service signal power correction factors. The array or curve-fit characterization can be measured in a laboratory setting by comparing the variation from injected signal power to received signal power as these variables are adjusted using controlled sources (e.g., conventional power supply, conductive signal supply equipment, and temperature chamber).

In wireless transceivers utilizing a conventional power regulator packaged in an integrated circuit (IC) for maintaining a constant voltage level across the receiving portion of the wireless transceiver circuit there generally is no noticeable variance between injected signal power and received signal power. In this instance, there is no influence from this variable in determining an in-service signal power correction factor, and under these circumstances this variable may be removed from the array.

Similarly, with current advances in semiconductor manufacturing where parasitic effects have been minimized, it has been observed that varying injected signal power while maintaining supply power and ambient temperature constant has negligible variance between injected signal power and measured received signal power. Thus, this variable may also be removed from the array.

Analog performance of conventional semiconductor devices, however, is known to vary over a wide temperature range especially as it relates to conventional receiver circuits. For instance, selective call radios 106 expected to operate at a temperature range between −10 to 60 degrees Celsius will inevitably show variance between the signal power measured by the selective call radio 106 and injected signal power. To remove these variances, a number of temperature dependent in-service signal power correction factors are measured by characterizing the plurality of selective call radios 106. These correction factors may be determined in temperature intervals having as much resolution as needed to optimize system performance of the communication system 100. For example, for the above temperature range, seven temperature intervals (−10 to 0; 0 to 10; 10 to 20; 20 to 30; 30 to 40; 40 to 50; 50 to 60) may be used for measuring seven temperature dependent in-service signal power correction factors, which may be used to equalize any variance between injected signal power and the signal power measured by the selective call radio 106.

Although the supply power and injected signal power variables were ignored above, if it were determined that these variables do have an effect (for reasons other than stated above) on variance between injected signal power and received signal power, these factors could be used to determine a three dimensional in-service signal power correction factor array or curve-fit for calculations thereof.

Now that a description has been provided for determining temperature dependent in-service signal power correction factors, we proceed with a description for determining temperature dependent in-service noise power correction factors. Like the characterization process used for in-service signal power, temperature variance is a leading factor for in-service noise power variations when compared to the out-of-service noise power baseline. Another leading factor is interference between communication zones 102 sharing the same frequency.

In the case where both of these variations are tracked, a multi-dimensional array or curve-fit is used to determine corresponding in-service noise power correction factors, each dependent on temperature and interference levels measured by the selective call radio 106. The correction factors are determined using a similar technique as described in step 202 for determining the out-of-service noise power baseline. The difference is that temperature is varied in intervals as described above for the signal power correction factors. Similarly, ranges of interference may be applied to the selective call radio 106 to measure any offsets from the out-of-service noise power baseline. If interference is measured during operation, then the selective call radio 106 will also be programmed to measure signal interference in step 206 using the conventional constellation technique described above.

With the characterization data available for signal and noise powers, the selective call radio 106 can proceed with determining the modified signal and noise powers of step 208. The modified signal power is determined from the in-service signal power, the in-service signal power correction factor dependent on the temperature measured in step 206, and the out-of-service signal power correction factor measured in step 202. In turn, the modified noise power is determined from the in-service noise power, the in-service noise power correction factor dependent on the temperature measured in step 206, and the out-of-service noise power baseline measured in step 202. The foregoing determination steps may be performed in several ways.

In one embodiment, the in-service and out-of-service signal power correction factors (calculated or selected according to the temperature measured in step 206) are summed with the in-service signal power resulting in the modified signal power. Similarly, the modified noise power may be determined by summing the in-service noise power correction factor (calculated or selected according to the temperature measured in step 206) and the out-of-service baseline with the in-service noise power. Alternatively, any one of the factors may be ignored without affecting the utility of embodiments of the invention (e.g., eliminating the in-service noise power correction factor).

Alternatively, a noise power characterization factor can be determined from characterizing at least one of the plurality of selective call radios 106. The characterization process may involve, for example, statistical sampling of the plurality of selective call radios 106 to determine a common noise power level applied across the operating range of temperature, power supply voltage, or injected radiated or conductive signal power. In this embodiment, the modified noise power can be calculated from the sum of the noise power characterization factor and the in-service noise power correction factor corresponding to the temperature of step 206.

Any combination or modification in the calculations or characterization methods described above for determining the modified signal and/or noise power that adds utility to embodiments herein is intended to be within scope and spirit of the claims described below. For example, instead of summing the correction factors to their respective measured signal and noise powers, other mathematical techniques can be used to calculate the modified signal and noise powers such as ratios, running averages, or combinations thereof that add utility herein.

Once the modified signal and noise powers have been determined in step 208, we proceed with steps 210 and 212. In these steps the selective call radio 106 is programmed to perform a handover from a first communication zone 102 to a second communication zone 102 if the modified signal and noise powers and a handover threshold satisfy a predetermined condition.

Handover thresholds are common and well known in the art. Any conventional technique for determining the handover threshold can be used by the embodiments herein. Moreover, depending on environmental conditions, multiple handover thresholds may be used. For instance, while a user of a selective call radio 106 is traveling in an automobile, the selective call radio 106 may detect a fast change in signal power warranting the use of a conventional handover threshold designed for a faster handover trigger. While in a relatively fixed immobile setting, the selective call radio 106 may choose a handover threshold with less sensitivity, and therefore less likely to cause an early or premature handover. In this example, two handover thresholds might be used: one for fast mobility and one for slow mobility.

Turning to the predetermined condition for triggering a handover between communication zones 102, this condition may be satisfied by comparing the modified signal and noise powers to the handover threshold, and performing the handover if the modified signal and noise powers are within a range of the handover threshold. The range may be based on the modified signal and noise powers exceeding or being at or near equality to the handover threshold, or combinations thereof. Alternatively, the comparison may take on more sophisticated comparison algorithms such as running averages, ratios or combinations thereof. Any one or combinations of these techniques is applicable to the present invention. It should be noted that for the cases where the predetermined condition for handover is not satisfied in step 210 or a handover has occurred in step 212, the selective call radio proceeds to step 204 where it repeats the steps described above to determine whether a handover process is required. Cycling through steps 204–212 need not be periodic.

The proceeding description of the invention provides methods and apparatuses for substantially reducing inadvertent handovers by the selective call radios 106. By doing so, many embodiments herein avoid the need for adding additional radio base stations 104 to reduce dropped calls from premature or late handovers. As noted earlier, this invention is not limited to the selective call radios 106. The invention is applicable to the radio base stations 104 as well. That is, the radio base stations 104 in several embodiments can use the claimed concepts herein to more accurately instruct the selective call radios 104 when a handover satisfies the predetermined condition described above. Accordingly, two decision points (the selective call radio 106 and the radio base station 104) can further be used to improve the accuracy of a handover yet even more, and thereby add substantial economic benefit to the designers of communication systems 100.

The invention described herein may take the form of innumerable embodiments, which in some instances use, add to, or modify a portion of the measurements and calculations stated above. In view of the utility of these embodiments, all of these modifications are considered equivalent embodiments of the invention and are intended to be within the scope of the claims herein.

It should also be recognized that the claims are intended to cover the structures described herein as performing the recited functions (or portions thereof) of method 200 and not only structural equivalents. The claims are sufficiently general to include equivalent structures. For example, although a digital circuit and an analog circuit may not be structural equivalents in that a digital circuit employs discrete sampling techniques, while an analog circuit employs continuous sampling techniques, it is well known in the art that any digital and analog circuit may be designed to be equivalent structures generating nearly the same results. Similarly, the algorithms used in digital processing may be emulated with analog designs. Accordingly, all equivalent modifications of the description above are intended to be included within the claimed scope as defined in the following claims.

What is claimed is:

1. In a selective call radio operating in a communication system comprising a plurality of communication zones, a method of minimizing handovers between the selective call radio and the plurality of communication zones, comprising the steps of:

measuring a temperature of the selective call radio receiving radiated signals from a first one of the plurality of communication zones;
measuring in the selective call radio an in-service signal power based on the radiated signals;
determining a modified signal power from the in-service signal power and an in-service signal power correction factor corresponding to the temperature; and
performing a handover by the selective call radio from the first one of the plurality of communication zones to a second one of the plurality of communication zones if the modified signal power and a handover threshold satisfy a predetermined condition by comparing the modified signal power to the handover threshold and performing the handover if the modified signal power is within a range of the handover threshold.

2. The method of claim 1, wherein the determining step further comprises the step of looking up the in-service signal power correction factor in a look-up table of the selective call radio.

3. The method of claim 1, wherein the determining step further comprises the step of calculating the in-service signal power correction factor.

4. The method of claim 1, wherein the determining step further comprises the step of measuring the in-service signal power correction factor by characterizing at least one of a plurality of selective call radios.

5. The method of claim 1, further comprising the steps of:
measuring in the selective call radio an in-service noise power based on the radiated signals;
determining a modified noise power from the in-service noise power and an in-service noise power correction factor corresponding to the temperature; and
performing the handover if the modified signal power and the modified noise power, and the handover threshold satisfy the predetermined condition.

6. The method of claim 5, wherein the determining step further comprises the step of looking up the in-service signal and noise power correction factors in a look-up table of the selective call radio.

7. The method of claim 5, wherein the determining step further comprises the step of calculating the in-service signal power and noise power correction factor.

8. The method of claim 5, wherein the determining step further comprises the step of measuring the in-service signal power and noise power correction factor by characterizing at least one of a plurality of selective call radios.

9. The method of claim 1, further comprising the steps of:
measuring in the selective call radio an out-of-service signal power in a controlled environment;
determining an out-of-service signal power correction factor from the out-of-service signal power; and
determining the modified signal power from the in-service signal power and the in-service and out-of-service signal power correction factors.

10. The method of claim 9, further comprising the steps of:
measuring in the selective call radio an out-of-service noise power in the controlled environment;
determining an out-of-service noise power baseline from the out-of-service noise power;
determining a modified noise power from the in-service noise power, the in-service noise power correction factor, and the out-of-service noise power baseline; and
performing the handover if the modified signal power and the modified noise power satisfies the predetermined condition.

11. The method of claim 1, further comprising the steps of:
measuring in the selective call radio a noise power characterization factor by characterizing at least one of a plurality of selective call radios;
determining a modified noise power from the noise power characterization factor and an in-service noise power correction factor corresponding to the temperature; and
performing the handover if the modified signal power and the modified noise power satisfies the predetermined condition.

12. A selective call radio operating in a communication system comprising a plurality of radio base stations operating in a corresponding plurality of communication zones, wherein the selective call radio comprises:
a transceiver; and
a processor coupled to the transceiver, wherein the processor is programmed to:
measure a temperature of the selective call radio receiving radiated signals from a first one of the plurality of communication zones;
measure an in-service signal power based on the radiated signals;
determine a modified signal power from the in-service signal power and an in-service signal power correction factor corresponding to the temperature; and
perform a handover from the first communication zone to a second one of the plurality of communication zones if the modified signal power and a handover threshold satisfy a predetermined condition by comparing the modified signal power to the handover threshold and performing the handover if the modified signal power is within a range of the handover threshold.

13. The selective call radio of claim 12, wherein the processor is further programmed in the determining step to measure the in-service signal power correction factor by characterizing at least one of a plurality of selective call radios.

14. The selective call radio of claim 13, the processor is further programmed to:
measure in the selective call radio an out-of-service signal power in a controlled environment;
determine an out-of-service signal power correction factor from the out-of-service signal power; and
determine the modified signal power from the in-service signal power and the in-service and out-of-service signal power correction factors.

15. The radio base station of claim 13, the processor is further programmed to:
measure in the radio base station an out-of-service signal power in a controlled environment;
determine an out-of-service signal power correction factor from the out-of-service signal power; and
determine the modified signal power from the in-service signal power and the in-service and out-of-service signal power correction factors.

16. A radio base station among a plurality of radio base stations of a communication system operating in a corresponding plurality of communication zones coupled to a selective call radio, wherein the radio base station comprises:
a transceiver; and
a processor coupled to the transceiver, wherein the processor is programmed to:
measure a temperature of the radio base station receiving radiated signals from the selective call radio in a communication zone of the radio base station;

measure an in-service signal power based on the radiated signals;

determine a modified signal power from the in-service signal power and an in-service signal power correction factor corresponding to the temperature; and instruct the selective call radio to handover communication from the communication zone of the radio base station to a second communication zone of a corresponding second base station if the modified signal power and a handover threshold satisfy a predetermined condition by comparing the modified signal power to the handover threshold and performing the handover if the modified signal power is within a range of the handover threshold.

17. The radio base station of claim 16, wherein the processor determines the modified signal power by measuring the in-service signal power correction factor by characterizing at least one of the plurality of radio base stations.

* * * * *